United States Patent [19]

Popov et al.

[11] 4,211,943

[45] Jul. 8, 1980

[54] LINEAR INDUCTION MOTOR

[76] Inventors: Alexandr D. Popov, ulitsa Koroleva, 12, kv. 154; Vladimir A. Solomin, ulitsa Dachnaya, 14, kv. 31, both of Rostov-na-Donu; Dmitry A. Zvezdunov, ulitsa Estonskaya, 248-b, Bataisk Rostovskoi oblasti, all of U.S.S.R.

[21] Appl. No.: 37,012

[22] Filed: May 8, 1979

[30] Foreign Application Priority Data

May 10, 1978 [SU] U.S.S.R. .............................. 2618796

[51] Int. Cl.² ............................................ H02K 41/00
[52] U.S. Cl. ............................................ 310/13
[58] Field of Search ................................... 310/12–14, 310/254

[56] References Cited

U.S. PATENT DOCUMENTS

| | | | |
|---|---|---|---|
| 3,886,383 | 5/1975 | Ross et al. ............................ | 310/12 |
| 4,006,377 | 2/1977 | Ross ..................................... | 310/13 |
| 4,049,983 | 9/1977 | Attwood et al. ..................... | 310/13 |

*Primary Examiner*—Donovan F. Duggan
*Attorney, Agent, or Firm*—Fleit & Jacobson

[57] ABSTRACT

A linear induction motor comprising an inductor with a multiphase concentrated winding, a magnetic circuit, including groups of laminated cores, and an electrically conducting secondary element disposed within the inductor and separated by an air gap from the legs of the laminated cores whose laminations are directed perpendicular to the direction of movement of the magnetic field. In each of said groups, the laminated cores have their axes of symmetry positioned in a plane perpendicular to the direction of movement of the magnetic field and shifted circumferentially relative to one another by a given angle $\alpha$, while the axes of symmetry of the laminated cores of a subsequent group are shifted relative to the axes of symmetry of the laminated cores of a preceding group by an angle $\alpha/2$.

1 Claim, 2 Drawing Figures

LINEAR INDUCTION MOTOR

FIELD OF THE INVENTION

The invention relates to electrical machines, and more particularly to linear induction motors.

The invention is applicable to electric drives providing for reciprocating movement such as apparatus for pumping liquid metals and electrically conducting fluids.

DESCRIPTION OF THE PRIOR ART

Known in the art is a linear induction motor (cf. French Pat. No. 2,082,150, Int. Cl. H02k) comprising an inductor with a magnetic circuit including laminated cores and with a multiphase concentrated winding, and a secondary element which is comprised of electrically conducting material and having a cylindrical shape.

There is another linear induction motor (cf. Japanese Pat. No. 45,131, cl. 55A 423) comprising an inductor with a multiphase concentrated winding and a magnetic circuit including groups of laminated cores which are formed by legs coupled with yokes. In each group the cores are displaced relative to one another circumferentially. All of the core groups constitute a row arranged in the direction of movement of the running magnetic field, while the ends of the core legs form a surface which is called an active zone of the inductor and faces an electrically conducting secondary element of a cylindrical shape.

The known motors produce a small tractive force and have, therefore, a low efficiency. This is due to the fact that the magnetizing force in the air gap between the leg ends and the secondary element is distributed in odd manner (nonsinusoidally), which is caused by a serrated shape of the active zone, as the cores of the subsequent group do not mate tight the cores of the preceding group.

SUMMARY OF THE INVENTION

An object of the invention is to provide a linear induction motor having higher tractive force and efficiency, which is attained by the employment of an inductor providing for sinusoidal distribution of the magnetizing force in the air gap between the active zone of the inductor and an electrically conducting secondary element.

There is provided a linear induction motor comprising an inductor with a multiphase concentrated winding and a magnetic circuit, and an electrically conducting secondary element disposed within the inductor, the magnetic circuit being comprised of laminated cores each of which includes legs coupled by a yoke, the laminated cores of each group being displaced relative to one another circumferentially, in which motor, according to the invention, the magnetic circuit includes groups of inverted U-shaped laminated cores whose laminations are directed perpendicularly to a direction of movement of the magnetic field, each of said groups including at least three laminated cores which have their axes of symmetry positioned in a plane perpendicular to the direction of movement of the magnetic field and displaced circumferentially with respect to one another by angle $\alpha$, the laminated cores of the subsequent group being juxtaposed to the laminated cores of the preceding group with their legs, the axes of symmetry of the laminated cores of the subsequent group, positioned in a plane perpendicular to the direction of movement of the magnetic field, being displaced relative to the axes of symmetry of the laminated cores of the preceding group by an angle equal to half the value of the angle $\alpha$.

DESCRIPTION OF THE INVENTION

The invention will now be described, by way of example, with reference to the accompanying drawings, in which.

Figure 1:
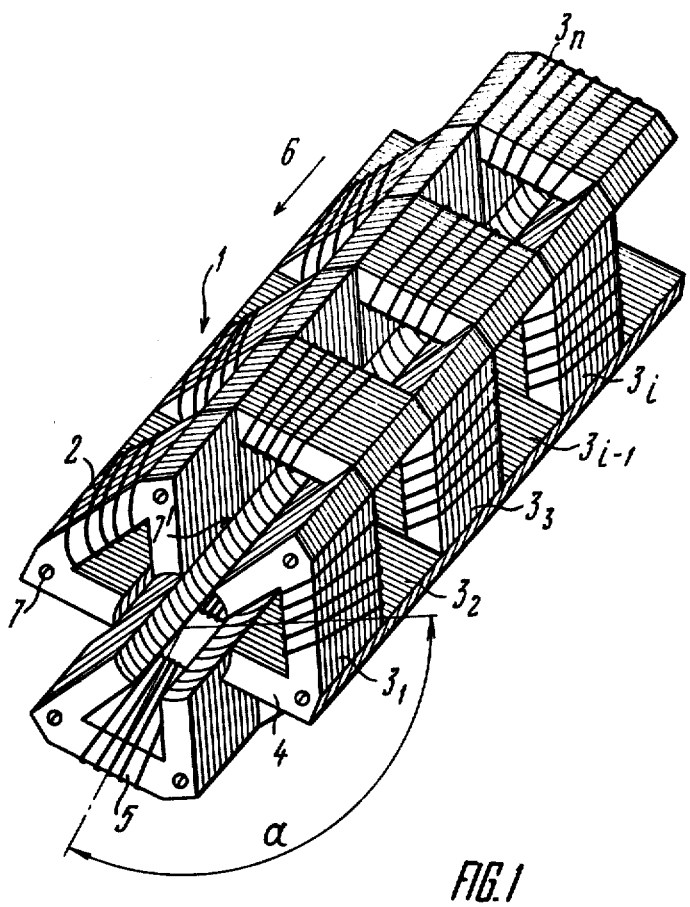
FIG. 1 is a general view of an inductor of a linear induction motor, according to the invention.

An inductor 1 (FIG. 1) of the linear induction motor of the invention comprises a multiphase concentrated winding 2 and a magnetic circuit which includes n groups of inverted U-shaped laminated cores $3_1$–$3_n$, where n is an integer selected within a range from 4 to 12, depending on the desirable parameters of the inductor 1. An ith laminated core $3_i$ is formed by legs 4 joined by a yoke 5, where i = 1, 2, ..., n. The direction of the laminations of the cores $3_1$–$3_n$ is perpendicular to the direction of movement of the magnetic field, as shown by an arrow 6. The laminated cores $3_i$ belonging to one group, for example, laminated cores $3_1$ of a first group, are located so that their axes 1 of symmetry, positioned in a plane perpendicular to the direction 6 of movement of the magnetic field, form a given angle $\alpha$. The value of the latter is determined by the number of laminated cores $3_i$ belonging to an ith group. The legs 4 of the laminated cores $3_2$ of a second group mate tight the legs of the laminated cores $3_1$, $3_3$ of the adjacent groups and are joined together, for example, by means of studs 7. In this case, active zones 7' of the inductor 1, having no teeth, are formed in the direction 6 of movement of the magnetic field.

Figure 2:
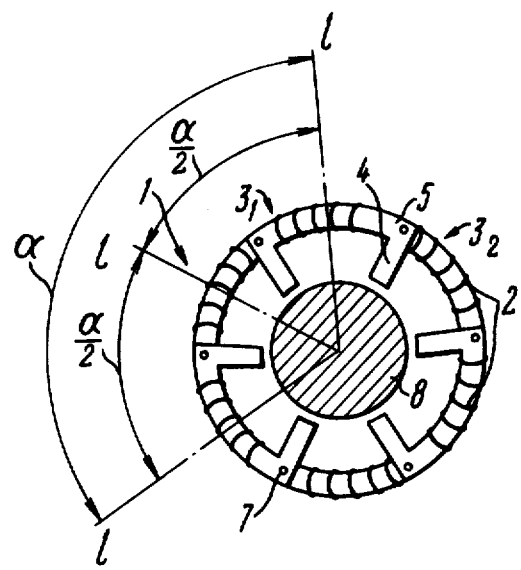
FIG. 2 is a general view of the linear induction motor, as viewed in a plane perpendicular to the movement of the magnetic field, according to the invention.

FIG. 2 illustrates a general view of the linear induction motor of the invention, as viewed in a plane perpendicular to the direction 6 (FIG. 1) of movement of the magnetic field. Here, the motor comprises an electrically conducting secondary element 8 (FIG. 2) which may be a metal or electrolyte. The element 8 has a cylindrical shape and is disposed within the inductor 1. FIG. 2 shows a relative location of the laminated cores $3_1$–$3_n$ in the corresponding groups. The laminated cores $3_1$ of the first group are so located that their axes 1 of symmetry, positioned in a plane perpendicular to the direction 6 (FIG. 1) of movement of the magnetic field, form a given angle $\alpha$ (FIG. 2). The laminated cores $3_2$ of the subsequent group (which is the second one in this case) are so located that their axes 1 of symmetry, positioned in a plane perpendicular to the direction 6 (FIG. 1) of movement of the magnetic field, are displaced with respect to the axes 1 (FIG. 2) of the laminated cores $3_1$ of the preceding (first) group by an angle equal to half the value of the angle $\alpha$, the axes 1 of symmetry of the laminated cores $3_3$ (FIG. 1) of the third group are displaced with respect to the axes 1 of symmetry of the laminated cores $3_2$ of the second group by an angle $\alpha/2$, etc.

The above-described location of the laminated cores $3_1$–$3_n$ provides for tight mating of their legs 4 in the adjacent groups so that a non-serrated zone 7' is formed.

The motor of the invention operates in the following manner. When the multiphase concentrated winding 2 of the inductor 1 is coupled to an a.c. power supply (not shown), a running magnetic field is established which is moved in the direction shown by the arrow 6 and intersects the electrically conducting element 8 (FIG. 2). The components of the running magnetic field are closed in a direction perpendicular to said direction. As a result, the motor produces a tractive force by which the secondary element 8 is moved in the direction shown by the arrow 6 (FIG. 1). Since the active zones 7' have no teeth, there results an even sinusoidal distribution of the magnetizing force in the air gap between the inductor 1 (FIG. 2) and the secondary element 8. As a result, the tractive force and, therefore, the efficiency of the motor is increased.

Therefore, the present invention makes it possible to increase the tractive force and efficiency of the linear induction motor. In addition, the motor of the invention has a condiderably simple construction; since the magnetic flux is closed transversely, the laminated cores $3_1$-$3_n$ of the inductor 1 should not be installed in a steel tubing.

The motor of the invention is simple to fabricate.

What is claimed is:

1. A linear induction motor comprising:
   an inductor;
   an electrically conducting secondary element disposed within said inductor and separated from the latter by an air gap;
   said inductor including a multiphase concentrated winding and a magnetic circuit;
   said magnetic circuit including groups of laminated cores;
   each of said groups of laminated cores, including at least three laminated cores which have an inverted U-shape and are comprised of two legs coupled by a yoke;
   said laminated cores whose lamination are located perpendicularly to the direction of movement of the magnetic field so as to establish a closed magnetic flux;
   axes of symmetry of said laminated cores of each of said groups, positioned in a plane perpendicular to the direction of movement of the magnetic field and shifted with respect to one another by a given angle $\alpha$;
   said legs of said laminated cores of a subsequent group, mating said legs of said laminated cores of a preceding group so as to provide for even distribution of the magnetic field within said inductor;
   said axes of symmetry of said laminated cores of a subsequent group, shifted with respect to the axes of symmetry of the laminated cores of a preceding group by an angle $\alpha/2$.

* * * * *